(12) United States Patent
Martin et al.

(10) Patent No.: US 7,222,234 B2
(45) Date of Patent: May 22, 2007

(54) METHOD FOR KEY AGREEMENT FOR A CRYPTOGRAPHIC SECURE POINT—TO—MULTIPOINT CONNECTION

(75) Inventors: Tobias Martin, Rabenau (DE); Joerg Schwenk, Henfenfeld (DE)

(73) Assignee: Deutsche Telekom AG, Bonn (DE)

( * ) Notice: Subject to any disclaimer, the term of this patent is extended or adjusted under 35 U.S.C. 154(b) by 496 days.

(21) Appl. No.: 10/333,289

(22) PCT Filed: Jul. 5, 2001

(86) PCT No.: PCT/EP01/07673

§ 371 (c)(1),
(2), (4) Date: Jan. 17, 2003

(87) PCT Pub. No.: WO02/11356

PCT Pub. Date: Feb. 7, 2002

(65) Prior Publication Data

US 2003/0177358 A1 Sep. 18, 2003

(30) Foreign Application Priority Data

Aug. 1, 2000 (DE) ................................. 100 37 500

(51) Int. Cl.
*H04L 9/00* (2006.01)
(52) U.S. Cl. ................ 713/171; 713/163; 713/156
(58) Field of Classification Search ................ 713/171, 713/163, 156
See application file for complete search history.

(56) References Cited

U.S. PATENT DOCUMENTS

| 5,369,705 | A | * | 11/1994 | Bird et al. ................... 713/163 |
| 6,094,485 | A | * | 7/2000 | Weinstein et al. ............. 380/30 |
| 6,105,131 | A | * | 8/2000 | Carroll ........................ 713/155 |
| 6,158,011 | A | * | 12/2000 | Chen et al. .................... 726/15 |
| 6,385,647 | B1 | * | 5/2002 | Willis et al. ................. 709/217 |
| 6,477,580 | B1 | * | 11/2002 | Bowman-Amuah ......... 709/231 |
| 6,560,707 | B2 | * | 5/2003 | Curtis et al. ................. 713/163 |
| 6,584,567 | B1 | * | 6/2003 | Bellwood et al. ........... 713/171 |
| 6,681,017 | B1 | * | 1/2004 | Matias et al. ................ 380/277 |
| 6,732,179 | B1 | * | 5/2004 | Brown et al. ................ 709/229 |
| 6,870,842 | B1 | * | 3/2005 | Caronni et al. ............. 370/390 |
| 6,874,084 | B1 | * | 3/2005 | Dobner et al. .............. 713/156 |

(Continued)

FOREIGN PATENT DOCUMENTS

EP 0887982 12/1998

OTHER PUBLICATIONS

G. Apostolopoulos et al. "Transport Layer Security: How much does it really cost" Mar. 21, 1999; pp. 717-725.

(Continued)

*Primary Examiner*—Emmanuel L. Moise
*Assistant Examiner*—Techane Gergiso
(74) *Attorney, Agent, or Firm*—Darby & Datby

(57) ABSTRACT

A method for key agreement for a cryptographically secured point-to-multipoint connection between a server and a plurality of clients includes altering, as a function of an identifier included in a first server message, a sequence of messages in a handshake initiating a secure socket layer protocol session. The identifier identifies the connection as an IP multicast connection. A MasterKey is generated using the server, the MasterKey being used to generate a session key for encrypting application data. The MasterKey is transmitted to the client.

10 Claims, 2 Drawing Sheets

U.S. PATENT DOCUMENTS

| | | | |
|---|---|---|---|
| 6,980,660 B1* | 12/2005 | Hind et al. | 380/282 |
| 7,013,389 B1* | 3/2006 | Srivastava et al. | 713/163 |
| 2003/0051136 A1* | 3/2003 | Curtis et al. | 713/163 |
| 2003/0097564 A1* | 5/2003 | Tewari et al. | 713/171 |
| 2003/0177358 A1* | 9/2003 | Martin et al. | 713/171 |

OTHER PUBLICATIONS

J. Toga "ITU-T standardization activities for interactive multimedia communications on packet-based networks: H.323 and related recommendations" Feb. 11, 1999; pp. 205-223.

Fan Du et al. "Towards Solving Multicast Key Management Problem" 1999, pp. 232-236.

* cited by examiner

METHOD FOR KEY AGREEMENT FOR A CRYPTOGRAPHIC SECURE POINT—TO—MULTIPOINT CONNECTION

BACKGROUND

The present invention relates to a method for key agreement for a cryptographically secured point-to-multipoint connection.

The increased use of the Internet also involves the risk of misuse and/or manipulation of the multitude of sometimes sensitive data that is exchanged over the Internet. The majority of Internet users and, of course, even more the experts are aware of the fact that the Internet has to be considered an unsafe environment in this respect. However, to increase the possibilities of use of the Internet in spite of this, there is an increasing demand for solutions for secure data transmission because of the aforementioned reasons. Solutions are required which ensure the confidentiality, integrity and authenticity of data. Due to the technical nature of the Internet as a network which is open to everybody, protection of sensitive data in the form of a physical access barrier is not applicable. Therefore, the solution to the problem consists in that the data that is passed over the Internet is encrypted at least to the extent that it is sensitive data or even generally, and that in the course of this encryption, criteria for proving the authenticity of the respective data are obtained by processing the data in a suitable manner.

In this context, different approaches for securing client-server connections have already become known. A method for key agreement which is used in connection that allow secure data exchange and which, meanwhile, is relatively widespread, is the so-called "Secure Sockets Layer Protocol" (SSL), which, in its standard variant, is also known as "Transport Layer Security" (TLS). This protocol establishes the modalities for a connection between a client and a server in which the data is transmitted in encrypted form. Using the protocol, the client and the server agree on the encryption method to be used, on the session keys used for encryption while the connection is active, on authenticity criteria and, possibly, on further connection modalities as, for example, methods for reducing the data volume by data compression. In this context, the advantage of the method is to be seen in that the SSL protocol seamlessly integrates into the OSI layer model for data transfer. In this respect, the protocol represents a transition (socket) which is transparent in both directions, preferably between the application layer and the transport layer according to the layer model. The SSL protocol is explained in greater detail, for example, by Stephen Thomas in "SSL & TLS Essential", John Wiley & Sons, New York 2000, which is Stephen Thomas in "SSL & TLS Essential", John Wiley & Sons, New York 2000, which is hereby incorporated by reference herein. The protocol will be discussed in greater detail later in the context of the explanation of the present invention.

As described, SSL/TLS was designed to secure point-to-point connections. This becomes clear, inter alia, from the fact that two of the three values (PremasterSecret, ClientRandom) from which the cryptographic key is ultimately derived, are generated by the client. Therefore, it is not possible for the server to use the same key in the communication with different clients, respectively. This fact makes it impossible for the SSL handshake, as is known from the standard SSL protocol, to be used in point-to-multipoint connections, with the server as the data source and a plurality of clients as data sinks. In many application cases, such IP multicast connections allow effective use of the bandwidth available in the network and, overall, an economical use of time and hardware resources. They are used, for example, in the streaming of audio/video data. Here too, however, there is of course a need for connections that are protected from misuse and manipulation. In this context, however, only proprietary solutions have become known so far, such as in connection with DVB (Digital Video Broadcast), which, however, cannot be so easily used for other purposes.

SUMMARY OF THE INVENTION

Therefore, an object of the present invention is to provide a universal method for key agreement for a cryptographically secured point-to-multipoint connection. Moreover, the intention is for the method to mesh, with as little modification as possible, with already existing transmission concepts and security architectures, but, in particular, to integrate with the OSI layer model without difficulty.

The present invention provides a method for key agreement for a cryptographically secured point-to-multipoint connection between a server and a plurality of clients. The method includes: altering, as a function of an identifier included in a first server message, a sequence of messages in a handshake initiating a secure socket layer protocol session, the identifier identifying the connection as an IP multicast connection; generating a MasterKey using the server, the MasterKey being used to generate a session key for encrypting application data; and transmitting the MasterKey to the client.

According to the present invention, the key agreement during connection set-up is initially carried out in accordance with the SSL or TLS protocol; however, the sequence of messages in the handshake which initiates the SSL session is altered as a function of an identifier which is contained in a server message and identifies the connection to be established as an IP multicast connection. At the same time, the server generates the MasterKey which is used to generate the session key(s) for encrypting the application data. The MasterKey generated by the server is then transmitted to the client, possibly encrypted with the public key of the client. In this context, whether the MasterKey is encrypted with the public key of the client depends on the specific method variant selected; the method variants, which are the subject matter of embodiments of the method according to the present invention, being explained below. The MasterKey is transmitted to the client using a message which is hereinafter referred to as "ServerMasterKeyExchange message". This message differs from the ServerKeyExchange message used in some implementations of the standard SSL. In the standard SSL, the serves uses the last-mentioned message to make its public key known to the client (in unencrypted form). This public key is then later used by the client to encrypt the MasterKey that it generates and transmits to the server. In contrast to that, the key which, according to the present invention, is transmitted with the ServerMasterKeyExchange message is the MasterKey which is used to derive the further session keys and which, in a departure from the standard SSL, is thus generated by the server and not by the client, and made available for use in the particular session. To avoid misunderstandings, this message is hereinafter referred to as "ServerMasterKeyExchange message".

According to an embodiment of the method according to the present invention, the identifier (IP multicast identifier) which is used to identify the connection as an IP multicast connection forms part of the ClientCerficateType requested by the server with the CertificateRequest message.

Another variant of the present invention provides for a different, new server message, which is still to be defined for the practical implementation of the present invention, to be included in the handshake protocol. This message is virtually a modified ServerMasterKeyExchange message with which the MasterKey generated by the server and, depending on the further refinement of this variant, an identifier which identifies the connection as an IP multicast connection, is/are transmitted by the server to the client. In principle, therefore, there exists the possibility that the IP multicast identifier is already transmitted with the CertificateRequest message of the server or only later as a part of the already mentioned, modified ServerMasterKeyExchange message. However, since in the latter case, problems arise with regard to downward compatibility with the standard SSL (until receipt of the modified ServerMasterKeyExchange message, the client assumes a sequence according to the standard SSL handshake and thus can possibly not do anything with the modified ServerMasterKeyExchange message, which is foreign to it), preference should be given to the first variant.

If the IP multicast identifier is included in the CertificateRequest message, a process regime according to an embodiment of the present invention is as follows. After the client has received the CertificateRequest message including the IP multicast identifier from the server, the sequence of the handshake which initiates the SSL session is initially altered in such a way that the generation of the MasterKey by the client is omitted. The client transmits its certificate without sending a ChangeCipherSpec message and a Finished message immediately afterwards and switching to encrypted transmission, as would otherwise correspond to the SSL handshake. Upon receipt of the certificate of the client, the server sends a ServerMasterKeyExchange message. This message includes the MasterKey or the MasterSecret from which the session keys are derived in the further sequence. Immediately after sending the ServerMasterKeyExchange message, the server sends ChangeCiperSpec and, after that, Finished. The client acknowledges receipt of the ServerMasterKeyExchange message in that it, in turn, sends ChangeCiperSpec and Finished and switches to the mode for encrypted transmission. Subsequent to this, the actual session, during which the data is encrypted, can begin. In this method variant, the key exchange, namely the transmission of the MasterKey via the initially still insecure channel, takes place just as in the standard SSL protocol. However, this is unproblematic in that the MasterKey is encrypted with the public key of the client in this method variant.

According to another variant of the method proposed by the present invention, the MasterKey, which is used to derive the keys for the actual session, is exchanged via a channel that is already SSL-/TLS-secured. Consequently, the method sequence is somewhat different. Initially, the handshake is executed according to the standard SSL protocol until the ChangeCipherSpec message of the server. It is only after this that the further sequence is modified. In this context, immediately subsequent to the ChangeCipherSpec message, the server sends a new message, which is still to be exactly defined in practice in case of a possible inclusion in the standard. This message is virtually a modified ServerMasterKeyExchange message which always includes a new MasterKey generated by the server and, possibly, an IP multicast identifier that switches the sequence. In this method configuration, the MasterKey can be transmitted with the public key of the client without further encryption since the client and the server already operate in encrypted mode due to the ChangeCipherSpec messages which have already been sent by them. The client responds to this with a new ChangeCipherSpec message and by sending the Finished message once again. This is then followed by the repeated sending of ChangeCipherSpec and Finished by the server. In this case, upon sending the Finished message, the client and the server switch to a mode for encrypting the data using the new MasterKey.

The present invention is embodied in a particularly advantageous manner, if the server, in the communication with a client, in each case uses the same CipherSuite it has previously taken as a basis for the handshake in the communication with other clients. If this CipherSuite is not included in the ClientHello message, the server expediently sends an error message. The variant described last, which is executed according to the standard SSL protocol until the server sends the ChangeCipherSpec message for the first time, is embodied in a particularly advantageous manner if at the second ChangeCipherSpec, the server maintains the same CipherSuite which also servers as a common CipherSuite in the communication with the other clients.

BRIEF DESCRIPTION OF THE DRAWINGS

In the following, the present invention will be explained in greater detail based on exemplary embodiments with reference to the drawings, in which.

DETAILED DESCRIPTION

Figure 2:
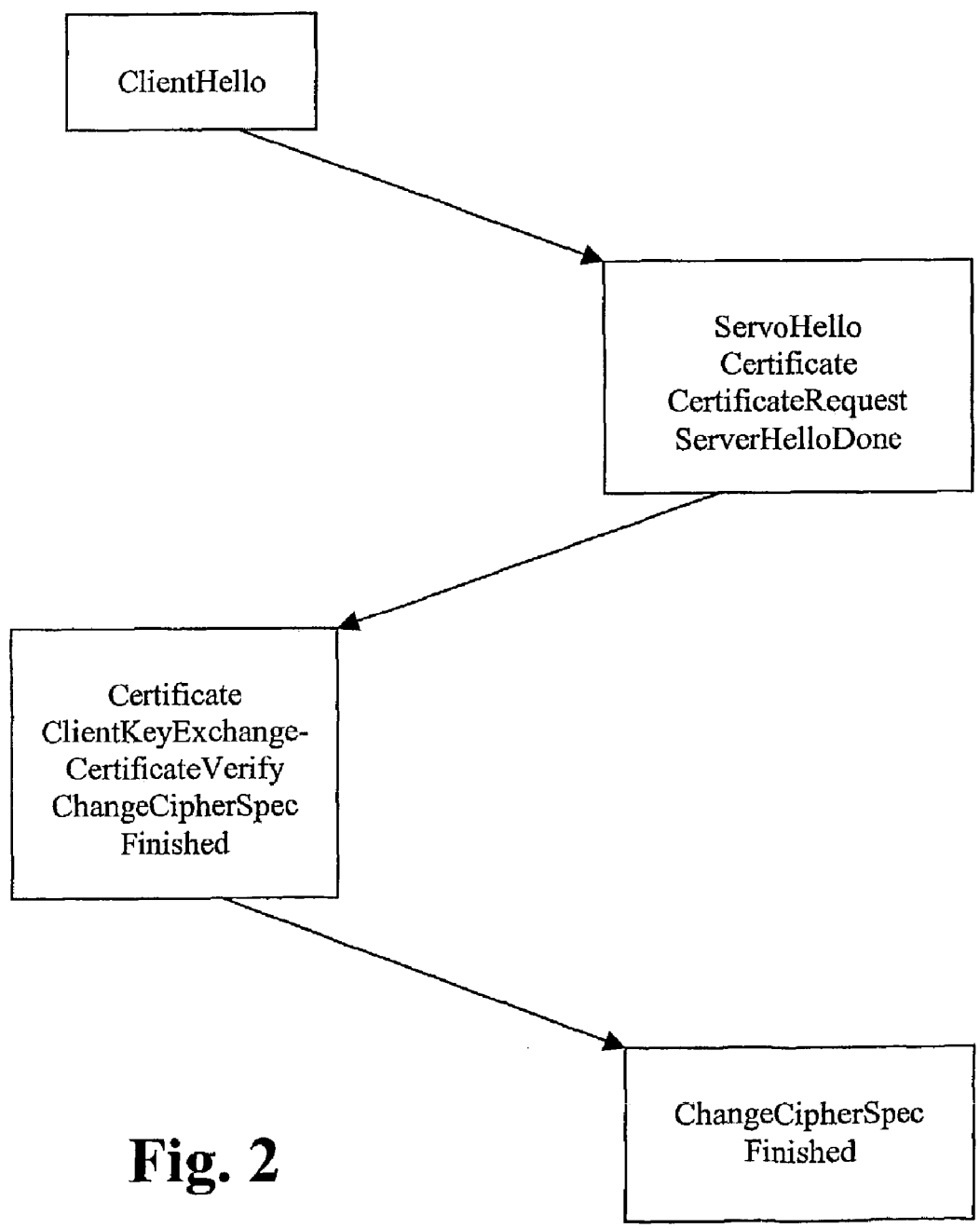
FIG. 2 shows a block diagram of a prior art SSL handshake.

For better understanding, first of all the SSL handshake according to the standard SSL protocol will be briefly explained. The handshake is accomplished in accordance with the following sequence, which is additionally shown in a block diagram in FIG. 2.

| Client | | Server |
| --- | --- | --- |
| ClientHello message including the proposed SSL options | → | |
| | ← | ServerHello message including the selected SSL options |
| | ← | Certificate message including server certificate |
| | ← | CertificateRequest message, the client is requested to authenticate itself |
| | | ServerHelloDone message |
| Certificate message including client certificate | → | |
| ClientKeyExchange message including session key (encrypted with public key of the server) | → | |
| CertificateVerify message including signature of all preceding handshake messages | → | |
| ChangeCipherSpec | → | |
| Finished | → | |
| | ← | ChangeCipherSpec |
| | ← | Finished |

The SSL session begins with the ClientHello of the client. The server responds to this with a ServerHello message and subsequently makes its certificate known to the client. The ServerHello block initiated by the ServerHello message also includes a CertificateRequest message with which the server requests the client to authenticate itself. The ServerHello block is terminated by the ServerHelloDone message. The client authenticates itself to the server with a Certificate message and a CertificateVerify message that will be explained below. However, after the Certificate message, the client first sends a ClientKeyExchange message. With this message, the client informs the server of the MasterKey, which is encrypted with the PublicKey of the server and which is used in the further course of the procedure to derive the session keys in accordance with the encryption method agreed upon between the client and the server. The ClientKeyExchange message of the client is then followed by the CertificateVerifymessage which is used by the client to sign the preceding handshake messages. The client sends ChangeCipherSpec and Finished to terminate the handshake and switches to the mode for encrypted transmission immediately afterwards. The server, in turn, acknowledges this with ChangeCipherSpec and Finished and switches to the mode for transmitting encrypted data, as well.

Figure 1:
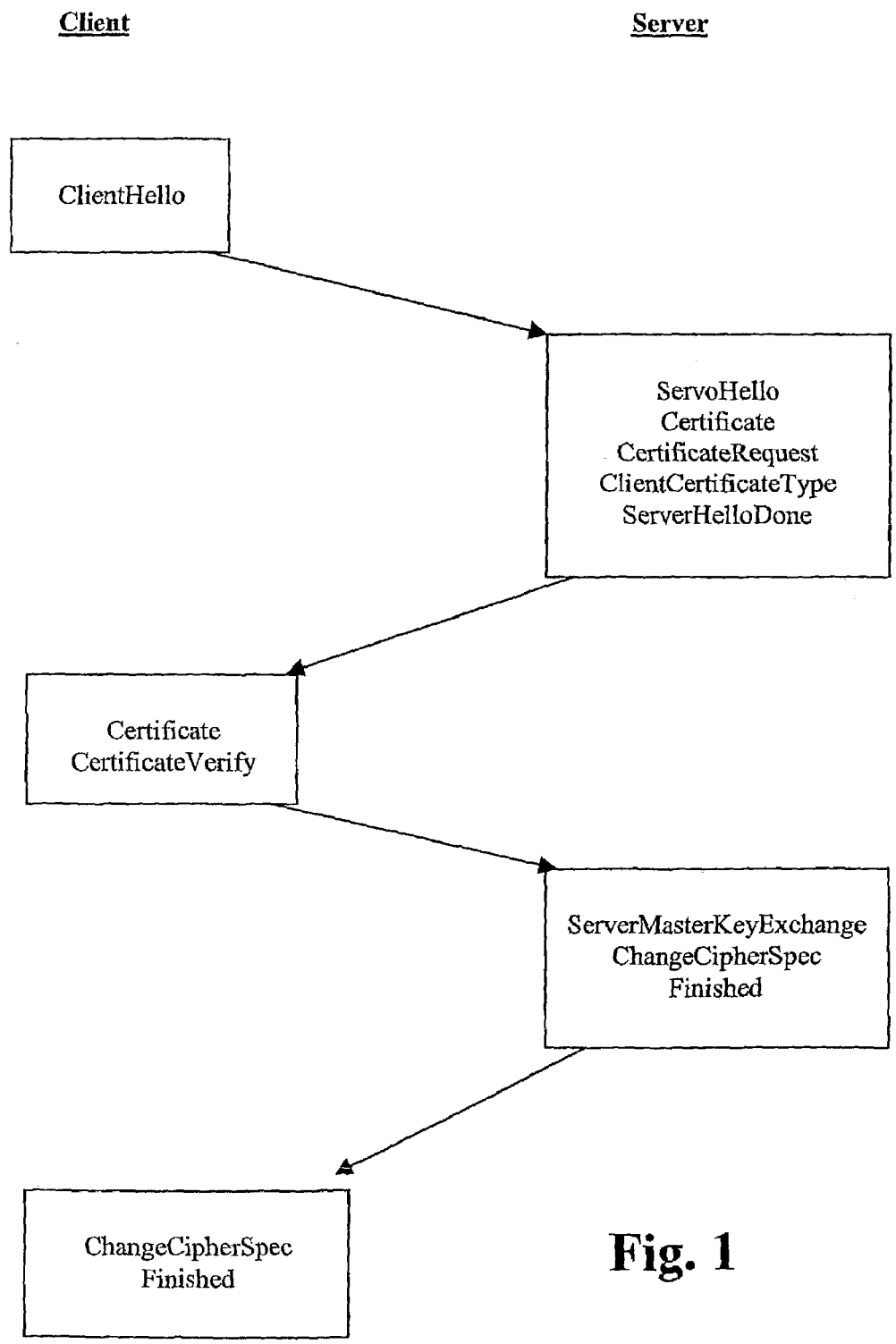
FIG. 1 shows a block diagram of a handshake according to a method of key agreement according to the present invention.

As can be seen from the described sequence, the MasterKey for deriving the further session keys is generated by the client. In this context, two of the three values, namely the PremasterSecret and the ClientRandom are provided by the client. Of course, the MasterKey provided by the client can therefore not be used for the communication with other clients. This is the starting point of the present invention. The present invention starts from the idea of adding an IP multicast identifier to one of the messages sent by the server, thus modifying the sequence of the handshake protocol, and of causing the MasterKey to be generated not by the client but by the server as a result of this modified sequence. To this end, according to a first variant of the method according to the present invention, which is additionally shown in a block diagram in FIG. 1, the handshake could be as follows:

| Client | | Server |
|---|---|---|
| ClientHello | → | |
| | ← | ServerHello |
| | ← | Certificate |
| | ← | CertificateRequest ClientCertificateType: Multicast (e.g., 30) |
| | ← | ServerHelloDone |
| Certificate | → | |
| CertificateVerify | → | |
| | ← | ServerMasterKeyExchange |
| | ← | ChangeCipherSpec |
| | ← | Finished |
| ChangeCipherSpec | → | |
| Finished | → | |

At the beginning of the session, as in the standard SSL protocol, the client initially transmits a ClientHello message to the server. The server responds with a ServerHello message as well, also still following the standard sequence. The ServerHello message is followed by a Certificate message. The subsequently sent CertificateRequest message includes an identifier in the form of the ClientCertificateType which identifies the connection as an IP multicast connection, in this example indicated by the number 30. This IP multicast identifier signals to the client that the SSL handshake will subsequently be executed in a somewhat modified form, in particular, with the sequence of the messages being altered. The ServerHello block, which is initiated with the ServerHello message and includes the Certificate and the CertificateRequest including the IP multicast identifier, is terminated by the ServerHelloDone message. The client makes its certificate known in response to the request by the CertificateRequest message. This certificate must contain an identifier which authenticates the client for data exchange with the server in an IP multicast connection. However, unlike in the handshake protocol according to the standard SSL, the client does not transmit a ClientKeyExchange message after sending the Certificate message, but only signs the previously sent messages by the CertificateVerify. Also, the transmission of a ChangeCipherSpec message and of the Finished is omitted for the moment. Rather, a series of messages are initially sent by the server now. First, the server transmits a ServerMasterKeyExchange message, which includes the MasterKey which it has generated and which is encrypted with the public key of the client. Thus, in a departure from the standard SSL, the MasterKey generated by the server forms the basis for deriving the session keys required to encrypt the payload data. After sending the ServerMasterKeyExchange message, the server also transmits ChangeCipherSpec and Finished, and subsequently switches to the mode for encrypted transmission. It is only after this that the client, in turn, sends ChangeCipherSpec and Finished, and also switches to the mode for encrypting the data. Thus, in a departure from the handshake according to the standard SSL protocol, the initiation of the actual session, which takes place in encrypted mode, is not terminated by the Finished of the server but by the Finished of the client.

Another method variant is given in that the MasterKey, which is used to generate the session keys for encrypting the actual payload data, is already transmitted via an SSL-secured channel. A possible sequence of the handshake is then as follows:

| Client | | Server |
|---|---|---|
| ClientHello | → | |
| | ← | ServerHello |
| | ← | Certificate |
| | ← | CertificateRequest |
| | ← | ServerHelloDone |
| Certificate | → | |
| ClientKeyExchange message | → | |
| CertificateVerify | → | |
| ChangeCipherSpec | → | |
| Finished | → | |
| | ← | ChangeCipherSpec |
| | ← | modified ServerMasterKeyExchange IP multicast address or identifier IP multicast key |
| | ← | ChangeCipherSpec |
| | ← | Finished |
| ChangeCipherSpec | → | |
| Finished | → | |

The handshake proceeds according to the standard SSL protocol until the first ChangeCipherSpec message is sent. The server responds to this with a ChangeCipherSpec message which, however, is not followed by the Finished message in a departure from the usual sequence. Instead, the server now sends a message which is defined depending on the particular embodiment of the present invention. This message contains at least a MasterKey generated by the server and will therefore be referred to as "modified ServerMasterKeyExchange message" hereinafter. The exact form of this message depends on the time at which the IP multicast identifier is transmitted by the server to the client according to this second variant. In this context, as in the first variant above, the IP multicast identifier can be a part of the CertificateRequest message of the server or else from part of the modified ServerMasterKeyExchange according to the sequence described above. Another, embodiment includes the following scheme:

| Client | | Server |
|---|---|---|
| ClientHello | → | |
| | ← | ServerHello |
| | ← | Certificate |
| | ← | ServerHelloDone |
| Certificate | → | |
| ClientKeyExchange | → | |
| ChangeCipherSpec | → | |
| Finished | → | |
| | ← | ChangeCipherSpec |
| | ← | ClientAuthRequest |
| ClientAuthResponse (e.g., password or PIN) | → | |
| | ← | modified ServerMasterKeyExchange IP multicast address IP multicast key |
| | ← | ChangeCipherSpec |
| | ← | Finished |
| ChangeCipherSpec | → | |
| Finished | → | |

Here, the modified ServerMasterKeyExchange message is preceded by a ClientAuthRequest of the server. With this ClientAuthRequest, a prompt is issued to carry out the authentication by entering, for example, a password of a PIN at the client. The client transmits the password or the PIN to the server with the ClientAuthResponse message. The further sequence is according to the method variant described above.

When using one of the above described modified SSL protocols for establishing a Security Association in the sense of an IPSec standard, attention must also be paid that the individual messages or message blocks are transmitted as ISAKMP messages (IETF RFC 2408), and that, the ServerMasterKeyExchange message contains, in addition to the (Pre-)MasterSecret, also other information to allow the client to generate a Security Association for IP multicast (cf. IETF RFC 2401). This includes, inter alia, the IP multicast address and the Security Parameters Index (SPI) which must be set by the server here. Security Associations are bidirectionally identical, i.e., in both directions (transmission and reception).

Today, the SSL/TLS protocol is used on OSI layers 2 or 5. Since the IP protocol and thus, depending on the option, the IP multicast are used on layer 3, the present invention can be used between the application layer (Telnet, FTP or HTTP) and the transport layer TCP, just as the standard SSL protocol.

According to an embodiment of the üresent invention, the customer requests a special SSL, client certificate. In this certificate, an extension is set which indicates that this certificate can be used to encrypt data and is of the type Multicast SSL. With the transmission of the respective messages, it is indeed possible, as usual, to exchange random values (ClientRandom, ServerRandom) between the client and the server; however, these do not enter into the calculation of the MasterKey or of the MasterSecret. The MasterKey is generated by the server exclusively from the generated PremasterSecret.

What is claimed is:

1. A method for key agreement for a cryptographically secured point-to-multipoint connection between a server and a plurality of clients, comprising:
   altering, as a function of an identifier included in a first server message, a sequence of messages in a handshake initiating a secure socket layer protocol session, the identifier identifying the connection as an IP multicast connection;
   generating a MasterKey using the server, the MasterKey being used to generate a session key for encrypting application data;
   transmitting the MasterKey to a first client of the plurality of clients;
   wherein the first server message is a CertificateRequest message used to request a ClientCertificateType;
   and further comprising receiving the CertificateRequest message by the first client, and wherein, after the receiving, the altering is performed so that:
   a generation of the MasterKey by the first client is not performed and the first client transmits a client certificate to the server without sending a client ChangeCipherSpec message;
   the first client switches to encrypted transmission immediately after transmitting the client certificate to the server;
   the transmitting is performed by the server using a ServerMasterKeyExchange message, the MasterKey being encrypted with a public key of the first client;
   the server, after transmitting the ServerMasterKeyExchange message and after transmitting a server ChangeCipherSpec and a server Finished message, switches to a mode for encrypted data transmission; and
   the first client, after the server switches to the mode for encrypted data transmission, acknowledges the ServerMasterKeyExchange message received from the server by sending the client ChangeCipherSpec message and a client Finished message and switches to the mode for encrypted data transmission.

2. A method for key agreement for a cryptographically secured point-to-multipoint connection between a server and a plurality of clients, comprising:
   altering, as a function of an identifier included in a first server message, a sequence of messages in a handshake initiating a secure socket layer protocol session, the identifier identifying the connection as an IP multicast connection;
   generating a MasterKey using the server, the MasterKey being used to generate a session key for encrypting application data;
   transmitting the MasterKey to a first client of the plurality of clients;
   wherein the first server message is a CertificateRequest message used to request a ClientCertificateType; and
   wherein the altering is performed so that:
   the sequence of messages in the handshake follows the handshake according to a standard SSL protocol until the server transmits a first server ChangeCipherSpec message;
   then, instead of a Finished message, the server transmits a modified ServerMasterKeyExchange message so as to perform the transmitting of the MasterKey, the MasterKey being encrypted;
   then, the server transmits a second server ChangeCipherSpec message;
   the first client, as an acknowledgement of a receipt of the MasterKey and the second server ChangeCipherSpec message, sends a client ChangeCipherSpec message and a client Finished message; and then the first client switches to an encryption mode that uses the MasterKey.

3. The method as recited in claim 2 wherein the altering is performed so that:

the server transmits a ClientAuthRequest message prior to the transmitting of the modified ServerMasterKeyExchange message, the server, using the ClientAuthRequest message, requesting the first client to authenticate itself; and the first client transmits, prior to transmitting of the modified ServerMasterKeyExchange message, a ClientAuthResponse message acknowledging the requesting of the server for the first client to authenticate itself.

4. The method as recited in claim 3 wherein the server requests, using the ClientAuthRequest message, the first client to authenticate itself using at least one of a password and a PIN.

5. The method as recited in claim 3 wherein the altering is performed so that after the transmitting respective ChangeCipherSpec messages, the server and the first client use, for encryption, a same CipherSuite agreed upon during an initiation of the handshake using a ClientHello message and a ServerHello message.

6. The method as recited in claim 2 wherein the altering is performed so that after the transmitting the respective ChangeCipherSpec messages, the server and the first client use, for encryption, a same CipherSuite agreed upon during an initiation of the handshake using a ClientHello message and a ServerHello message.

7. A method for key agreement for a cryptographically secured point-to-multipoint connection between a server and a plurality of clients, comprising:

altering, as a function of an identifier included in a first server message, a sequence of messages in a handshake initiating a secure socket layer protocol session, the identifier identifying the connection as an IP multicast connection;

generating a MasterKey using the server, the MasterKey being used to generate a session key for encrypting application data;

transmitting the MasterKey to a first client of the plurality of clients;

wherein the transmitting is performed using the first server message, the first server message being a modified ServerMasterKeyExchange message and wherein the MasterKey is configured for later derivation of at least one session key; and wherein the altering is performed so that:

the sequence of messages in the handshake follows the handshake according to a standard SSL protocol until the server transmits a first server ChangeCipherSpec message;

then, instead of a Finished message, the server transmits a modified ServerMasterKeyExchange message so as to perform the transmitting of the MasterKey, the MasterKey being encrypted;

then, the server transmits a second server ChangeCipherSpec message;

the first client, as an acknowledgement of a receipt of the MasterKey and the second server ChangeCipherSpec message, sends a client ChangeCipherSpec message and a client Finished message; and then the first client switches to an encryption mode that uses the MasterKey.

8. The method as recited in claim 7 wherein the altering is performed so that:

the server transmits a ClientAuthRequest message prior to the transmitting of the modified ServerMasterKeyExchange message, the server, using the ClientAuthRequest message, requesting the first client to authenticate itself; and the first client transmits, prior to transmitting of the modified ServerMasterKeyExchange message, a ClientAuthResponse message acknowledging the requesting of the server for the first client to authenticate itself.

9. The method as recited in claim 8 wherein the altering is performed so that after the transmitting the respective ChangeCipherSpec messages, the server and the first client use, for encryption, a same CipherSuite agreed upon during an initiation of the handshake using a ClientHello message and a ServerHello message.

10. The method as recited in claim 7 wherein the altering is performed so that after the transmitting the respective ChangeCipherSpec messages, the server and the first client use, for encryption, a same CipherSuite agreed upon during an initiation of the handshake using a ClientHello message and a ServerHello message.

* * * * *